Figure 1:
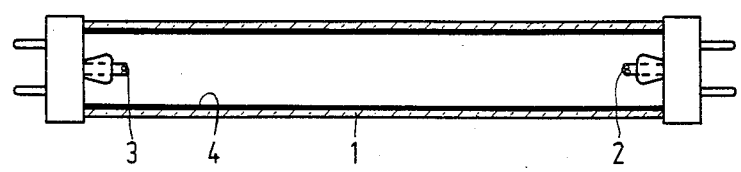

United States Patent [19]

Hoeks et al.

[11] Patent Number: 4,590,405
[45] Date of Patent: May 20, 1986

[54] BIVALENT EUROPIUM-ACTIVATED BARIUM ALUMINATE PHOSPHOR AND LOW MERCURY VAPOR DISCHARGE LAMP PROVIDED WITH A PHOSPHOR

[75] Inventors: Gerardus P. F. Hoeks; Marinus G. A. Tak, both of Eindhoven, Netherlands

[73] Assignee: U.S. Philips Corporation, New York, N.Y.

[21] Appl. No.: 750,663

[22] Filed: Jul. 1, 1985

Related U.S. Application Data

[63] Continuation of Ser. No. 451,994, Dec. 21, 1982, abandoned.

[30] Foreign Application Priority Data

Dec. 21, 1981 [NL] Netherlands .......................... 8105739

[51] Int. Cl.$^4$ ...................... H01J 61/44; C09K 11/08
[52] U.S. Cl. ............................... 313/486; 252/301.4 R
[58] Field of Search ....................... 313/485, 486, 487; 252/301.4 R

[56] References Cited

U.S. PATENT DOCUMENTS

| | | | |
|---|---|---|---|
| 4,088,923 | 5/1978 | Manders | 313/487 |
| 4,208,611 | 6/1980 | Watanabe et al. | 313/487 |
| 4,431,941 | 2/1984 | Roy et al. | 313/487 |

Primary Examiner—David K. Moore
Assistant Examiner—K. Wieder
Attorney, Agent, or Firm—Norman N. Spain

[57] ABSTRACT

A luminescent screen provided with a luminescent layer (4) disposed on a support (1) and containing an alkaline earth metal aluminate activated by bivalent europium. The alkaline earth metal is barium which may be replaced up to 25 mol. % by strontium. The aluminate has a crystal structure, the X-ray powder diagram of which corresponds or substantially corresponds to the diagram given in Table I of the description, while the ratio of alkaline earth metal to aluminium in the aluminate has a value of 1:5 to 1:10. An advantageous use of such a luminescent screen is found in low-pressure mercury vapor discharge lamps.

7 Claims, 2 Drawing Figures

BIVALENT EUROPIUM-ACTIVATED BARIUM ALUMINATE PHOSPHOR AND LOW MERCURY VAPOR DISCHARGE LAMP PROVIDED WITH A PHOSPHOR

This is a continuation of application Ser. No. 451,994, filed Dec. 21, 1982 now abandoned.

The invention relates to a luminescent screen provided with a luminescent layer which is disposed on a support and contains an alkaline earth metal aluminate activated by bivalent europium, the alkaline earth metal being barium of which up to 25 mol.% may be replaced by strontium. The invention further relates to a method of preparing such a luminescent aluminate and to a low-pressure mercury vapour discharge lamp provided with such a luminescent screen.

The British Patent Specification No. 1,190,520 discloses luminescent aluminates activated by bivalent europium, for the fundamental lattice of which is given the formula $MeAl_{12}O_{19}$. In this formula Me represents one or more of the alkaline earth metals Ba, Sr and Ca. On activation of these fundamental lattices by bivalent europium, which replaces part of the Me, very efficiently luminescing substances are obtained. The known aluminates have a characteristic hexagonal crystal structure, which is maintained also on activation by europium. This hexagonal crystal structure shows a great resemblance to that of the mineral magnetoplumbite, or in particular if for Me barium is chosen, to that of $\beta$-alumina. The two hexagonal structures of magnetoplumbite and $\beta$-alumina are closely related.

The known hexagonal barium aluminate activated by bivalent europium has, upon excitation by, for example, ultraviolet radiation, an emission band in the blue part of the spectrum with a maximum at approximately 440 nm and a half value width of approximately 55 nm. The invention has for its object to provide a luminescent screen provided with a new luminescent aluminate, especially such an aluminate which has an efficient blue emission at larger wave lengths than the known aluminate.

Experiments which have led to the invention have shown that a phase hitherto unknown is present in the system $BaO-Al_2O_3$. This novel substance is crystalline and is obtained with Ba:Al ratios of 1:5 to 1:10. It has been found that the crystal structure of the novel aluminate, in contrast with that of the known aluminates, is not hexagonal and therefore greatly differs from that of magnetoplumbite and of $\beta$-alumina. X-ray diffraction analyses carried out on the powder of the novel barium aluminate yield a characteristic X-ray powder diagram which is shown in the following table I. This table I gives for a number of reflections the d values (in Å) and the associated relative intensity I (the maximum I is set to 100). An X-ray powder diagram of a substance having a given crystal structure is, as is known, characteristic of and reproducible for the substance concerned, on the understanding that due to differences in treatment of the preparations small variations may occur, in particular in the intensity ratios.

TABLE I

| d(Å) | I | d(Å) | I | d(Å) | I |
|---|---|---|---|---|---|
| 6.84 | 30 | 2.88 | 63 | 2.12 | 44 |
| 5.31 | 65 | 2.83 | 24 | 2.04 | 12 |
| 4.76 | 75 | 2.74 | 16 | 2.02 | 37 |
| 4.62 | 15 | 2.71 | 10 | 2.01 | 17 |
| 4.47 | 7 | 2.65 | 4 | 2.00 | 32 |
| 4.31 | 8 | 2.61 | 9 | 1.902 | 21 |
| 4.05 | 21 | 2.57 | 5 | 1.869 | 8 |
| 3.79 | 23 | 2.55 | 6 | 1.847 | 11 |
| 3.69 | 21 | 2.53 | 9 | 1.828 | 8 |
| 3.68 | 23 | 2.51 | 21 | 1.807 | 8 |
| 3.60 | 36 | 2.44 | 30 | 1.790 | 11 |
| 3.48 | 15 | 2.39 | 9 | 1.767 | 13 |
| 3.46 | 14 | 2.35 | 5 | 1.749 | 17 |
| 3.42 | 100 | 2.32 | 8 | 1.737 | 11 |
| 3.31 | 5 | 2.30 | 22 | 1.705 | 7 |
| 3.24 | 14 | 2.27 | 15 | 1.645 | 8 |
| 3.20 | 7 | 2.25 | 32 | 1.633 | 18 |
| 3.12 | 39 | 2.23 | 18 | 1.599 | 14 |
| 2.99 | 83 | 2.22 | 24 | 1.580 | 8 |
| 2.96 | 47 | 2.16 | 53 | 1.575 | 16 |
|  |  |  |  | 1.568 | 11 |

A luminescent screen according to the invention is provided with a luminescent layer which is disposed on a support and contains an alkaline earth metal aluminate activated by bivalent europium, the alkaline earth metal being barium of which up to 25 mol.% may be replaced by strontium, and is characterized in that the aluminate has a crystal structure, the X-ray powder diagram of which corresponds or substantially corresponds to the diagram given in the above table I, and in that the molar ratio of alkaline earth metal to aluminum in the aluminate has a value of 1:5 to 1:10.

It has been found that on activation by bivalent europium of the novel barium aluminate, the crystal structure of which is characterized by the diagram of Table I, very efficiently luminescing substances are obtained, which can be excited by short-wave and long-wave ultraviolet radiation as well as by cathode rays and X-rays. The luminescent screens according to the invention have the advantage that the luminescing aluminates have a blue emission band with a maximum at approximately 480 nm and a half value width of approximately 80 nm. Such an emission is very suitable, in particular in low-pressure mercury vapour discharge lamps.

It has been found that in the novel barium aluminate up to 25 mol.% of the barium may be replaced by strontium, the crystal structure being maintained. This is apparent from the X-ray powder diagram of such substances which shows in comparison with the diagram of Table I substantially the same d values and relative intensities or with higher strontium contents only a small shift of d values and small intensity differences. The emission band of the strontium-containing aluminates is in comparison with the pure barium aluminate slightly wider and is slightly shifted towards shorter wave lengths (with 25 mol.% strontium the maximum emission lies at approximately 460 nm and the half width value is approximately 90 nm). A substitution of more than 25 mol.% of barium by strontium does not take place because it has been found that such large quantities of strontium are not incorporated in the lattice and too large a number of additional phases are obtained. It should be noted that comparatively small quantities of one or more additional phases (for example, up to at most approximately 25% by weight) need not always be disturbing. It has been found that an alkaline earth metal such as calcium can be present in the novel lattice only in trace quantities. Already with the use of small quantities of calcium (for example, 5 mol.%) for the major part other phases are formed than the desired phase. The pure calcium and strontium aluminates having the novel crystal structure therefore could not be formed. The europium used as activator substitutes part of the alkaline earth metal in the lattice, the crystal structure being maintained.

The novel aluminates can be obtained at values of the molar ratio of alkaline earth metal (i.e. barium, possibly strontium, and the europium substituting alkaline earth metal) to aluminum in the range of 1:5 to 1:10. The occurrence of such a range can be explained on the one hand by a possible solubility of $Al_2O_3$ in the lattice and on the other hand by the formation of small quantities of non-disturbing additional phases. Outside the said range too large quantities of additional phases are obtained.

Preferably a luminescent screen according to the invention is used, which is characterized in that the aluminate has a composition defined by the formula $Me_{1-p}Eu_pAl_qO_{1.5q+1}$, in which Me is barium or barium replaced up to 25 mol.% by strontium and in which $0.005 \leq p \leq 0.25$ and $5 \leq q \leq 10$. With europium contents p of less than 0.005 in fact only small luminous fluxes are obtained because the absorption of the excitation energy is too small, while at values of p above 0.25 the luminous flux decreases owing to concentration quenching.

The largest luminous fluxes are obtained with such luminescent screens at values of p in the range of $0.02 \leq p \leq 0.10$ and values of q in the range of $7 \leq q \leq g$. These screens in fact contain an aluminate with an optimum europium content p and an optimum value of the alkaline earth metal: aluminum ratio for the formation of the desired aluminate phase and are therefore preferably used.

The aluminates activated by bivalent europium for use in a luminescent screen according to the invention can generally be prepared by a solid state reaction at a high temperature of a starting mixture comprising oxides or oxide-producing compounds of the desired elements in the quantities suitable for the formation of the desired composition. This reaction should take place in a weakly reducing atmosphere (for example, nitrogen containing 1-10% by volume of hydrogen). It has been found that the reaction temperature is of importance for the formation of the desired aluminate phase. This temperature should lie between 1100° C. and 1400° C. Further the use of a melting salt or flux (for example, the use of part of the required barium in the form of barium fluoride) is very desirable.

An advantageous method of preparing the luminescing aluminate is characterized in that a mixture is made of barium oxide, of which up to 25 mol.% may be replaced by strontium oxide, alumina and europium oxide, or of compounds which are converted to these oxides on heating, the molar ratio of alkaline earth metal to aluminium is chosen to lie between 1:5 and 1:10, to which mixture is added boron oxide or a compound which is converted to boron oxide on heating in a quantity of 0.002 to 0.05 mole of boron per mole of aluminum, in that the mixture is heated in a weakly reducing atmosphere at a temperature of 1100° C. to 1400° C. and in that after cooling, the product obtained is washed with water. It has been found that boron oxide (or, for example, boric acid) promotes the formation of the aluminate phase. Whilst the formation of the aluminate without the use of a flux has proved to be very difficult, the use of very small quantities of boron (from 0.002 mole of B per mole of Al) already has the result that this formation is effected in a comparatively easy manner.

However, it has been found that the quantity of boron used is not allowed to be large (not larger than 0.05 mole per mole of Al), because with larger quantities undesired compounds are again obtained. In the method described herein, the product obtained upon heating, which already has favourable luminescent properties, is washed with water after cooling, the boron being removed again at least for the major part. By this washing treatment a final product with higher luminous fluxes is obtained. Such washed luminescent aluminates in general also contain still very small quantities of boron.

A luminescent screen according to the invention is preferably used in a low-pressure mercury vapour discharge lamp because the novel luminescent aluminate has an emission which is very desirable for such lamps and because it is very well excited by the mercury resonance radiation (approximately 254 nm) produced in these lamps.

Preferably, such a lamp is used, which is characterized in that the luminescent screen further comprises a green luminescing and a red luminescing substance. The use of these luminescing substances together with the novel alkaline earth metal aluminate in fact provides a lamp of the type having three emission bands. Such lamps, which serve for general lighting purposes, are very advantageous because with these lamps high luminous fluxes in combination with a good colour rendition can be obtained.

A very advantageous lamp of this type is characterized in that the green luminescing substance is a terbium-activated cerium magnesium aluminate and the red luminescing substance is an yttrium oxide activated by trivalent europium. These luminescent substances known per se have a high luminous flux and a suitable location of the emission. The use of the novel blue luminescing aluminate in these lamps has the advantage that a better colour rendition can be obtained.

Figure 2:
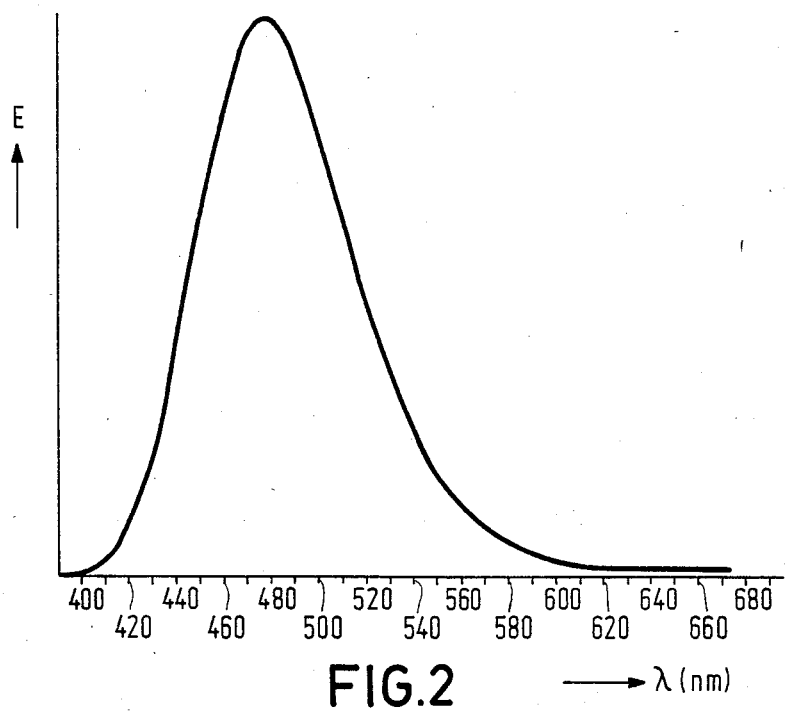

Embodiments of the invention will now be explained more fully with reference to a drawing. In the drawing:

FIG. 1 shows diagrammatically and in cross-section a low-pressure mercury vapour discharge lamp according to the invention, and FIG. 2 shows the spectral energy distribution of the emitted radiation of an alkaline earth metal aluminate activated by bivalent europium for use in a luminescent screen according to the invention.

In FIG. 1, reference numeral 1 designates the glass wall of a low-pressure mercury vapour discharge lamp. An electrode 2, 3 is arranged at each end of the lamp between which electrodes the discharge takes place during operation of the lamp. The lamp contains a small quantity of mercury and a rare gas as a starter gas. The wall 1 constitutes a luminescent screen and serves as a support of the luminescent layer 4, which comprises a luminescent alkaline earth metal aluminate activated by bivalent europium. The layer 4, which further may comprise, for example, a green luminescing substance and a red luminescing substance, may be provided on the wall 1 in a usual manner, for example, by means of a suspension containing the luminescent substance.

EXAMPLE OF PREPARATION 1

A mixture was made of

| | |
|---|---|
| 180.6 g | $BaCO_3$ |
| 4.38 g | $H_3BO_3$ |
| 398.9 g | $Al_2O_3$ |

-continued 8.4 g $Eu_2O_3$.

This mixture was heated in a furnace at 1300° C. for 1½ hours. During the heat treatment and also on heating and cooling of the furnace, a nitrogen current containing 5% by volume of hydrogen was passed through the furnace. The product thus obtained was pulverized and sieved after cooling and was then washed twice (each time for approximately 1½ hours) in 4 liters of water (at a temperature of approximately 90° C.). The aluminate thus obtained had a composition defined by the formula $Ba_{0.95}Eu_{0.05}Al_{8.10}O_{13.15}$. It was found that the X-ray powder diagram of this substance corresponded to the diagram of Table I (the crystal structure of all the examples still to be described of the novel aluminates was confirmed by means of X-ray diffraction analyses). The aluminate defined by the formula just given proved to have at 254 nm excitation (absorption 87%) a quantum efficiency of 80%. The spectral energy distribution of the emission of this substance is shown in FIG. 2. In this figure, the wave length λ (in nm) is plotted on the abscissa and the relative radiation energy E per constant wave length interval (in arbitrary units) is plotted on the ordinate. It has been found that the emission band has its maximum at approximately 480 nm and a half value width of approximately 80 nm. The colour point of the emitted radiation has the coordinates x=0.151 and y=0.238.

EXAMPLE OF PREPARATION 2

A mixture was made of
0.626 g $BaF_2$
3.269 g $BaCO_3$
8.673 g $Al_2O_3$
0.185 g $Eu_2O_3$.

This mixture was heated in a furnace at 1300° C. for 1½ hours. During heating of the furnace, a nitrogen current containing 5% by volume of hydrogen was passed through the furnace. During the heat treatment and also during cooling of the furnace, this gas current was first passed through water of 25° C. and then introduced into the furnace. The product thus obtained was pulverized and sieved. It had a composition equal to that of the substance of Example 1 and showed substantially the same emission. The quantum efficiency of this aluminate at 254 nm excitation (absorption 93%) was 80%.

EXAMPLES 3 TO 6 INCLUSIVE

In a manner analogous to that described in the Example of preparation 1, three aluminates were prepared, in which the barium was replaced in part by strontium. These preparations were effected on a smaller scale (samples of approximately 15 g) and for comparison Example 1 was also repeated. The formulae of these aluminates are given in Table II together with the measurements of the quantum efficiency q, the location of the maximum of the emission band $\lambda_{max}$ and the half value width of the emission band $\lambda_{\frac{1}{2}}$.

It is found that with an increasing Sr-content the value of $\lambda_{max}$ slightly decreases and that of $\lambda_{\frac{1}{2}}$ slightly increases.

TABLE II

| Example | Formula | q(%) | $\lambda_{max}$ (nm) | $\lambda_{\frac{1}{2}}$ (nm) |
| --- | --- | --- | --- | --- |
| 3 | $Ba_{0.95}Eu_{0.05}Al_{8.10}O_{13.15}$ | 81 | 478 | 78 |
| 4 | $Ba_{0.902}Sr_{0.048}Eu_{0.05}Al_{8.10}O_{13.15}$ | 80 | 475 | 80 |
| 5 | $Ba_{0.855}Sr_{0.095}Eu_{0.05}Al_{8.10}O_{13.15}$ | 79 | 471 | 84 |
| 6 | $Ba_{0.711}Sr_{0.239}Eu_{0.05}Al_{8.10}O_{13.15}$ | 67 | 461 | 90 |

EXAMPLES 7 TO 10 INCLUSIVE

Four aluminates having the composition $Ba_{1-p}Eu_pAl_{7.10}O_{11.65}$ with values for p of 0.01; 0.02; 0.05 and 0.10, respectively, were prepared in the manner indicated in Example of preparation 1. However, the heat treatment of the (smaller) samples for 1½ hours at 1300° C. was repeated twice and the products obtained were not subjected to a washing treatment. Measurements on the aluminates thus obtained of the quantum efficiency q and the absorption A of the exciting 254 nm radiation are indicated in Table III.

TABLE III

| Example | p | q(%) | A(%) |
| --- | --- | --- | --- |
| 7 | 0,01 | 56 | 79 |
| 8 | 0,02 | 56 | 85 |
| 9 | 0,05 | 56 | 91 |
| 10 | 0,10 | 56 | 94 |

EXAMPLES 11 TO 15 INCLUSIVE

Five aluminates with different alkaline earth metal: aluminum ratios and with an europium content of 0.01 were prepared in a manner indicated in the Examples 7 to 10 inclusive. The composition of these aluminates and the results of the measurement of the quantum efficiency q and of the absorption A of the exciting 254 nm radiation are given in Table IV.

TABLE IV

| Example | Formula | q(%) | A(%) |
| --- | --- | --- | --- |
| 11 | $Ba_{0.99}Eu_{0.01}Al_{9.77}O_{15.65}$ | 58 | 70 |
| 12 | $Ba_{0.99}Eu_{0.01}Al_{8.70}O_{14.05}$ | 62 | 73 |
| 13 | $Ba_{0.99}Eu_{0.01}Al_{7.83}O_{12.75}$ | 66 | 75 |
| 14 | $Ba_{0.99}Eu_{0.01}Al_{7.10}O_{11.65}$ | 56 | 79 |
| 15 | $Ba_{0.99}Eu_{0.01}Al_{6.49}O_{10.73}$ | 56 | 80 |

It was demonstrated for all the substances according to Examples 11 to 15 inclusive that the novel aluminate phase was obtained. It was found that besides very small non-disturbing quantities of $Al_2O_3$ (less than approximately 10% by weight) the substances according to Examples 14 and 15 also contained a small quantity of $BaAl_2O_4$.

A low-pressure mercury vapour discharge lamp of the kind described with reference to FIG. 1 was provided with a luminescent layer consisting of the luminescent aluminate obtained according to the Example of preparation 1. The lamp was of the 36 W type (length approximately 120 cm, lamp diameter approximately 26 mm). The lamp contained 5.04 g of the luminescent aluminate. It was found that the luminous flux initially emitted by the lamp was 2390 lm. After an operating time of 100 hours the luminous flux was 2240 lm. The colour point of the emitted radiation (at 0 hour and 100 hours) was x=0.161 and y=0.242.

A low-pressure mercury vapour discharge lamp of the same type as described above was manufactured, but in this case the luminescent layer contained a mixture of 28% by weight of the blue luminescing aluminate according to the Example of preparation 1, 42.1% by weight of a red luminescing oxide according to the formula $Y_2O_3$—$Eu^{3+}$ and 29.9% by weight of a green luminescing aluminate according to the formula $CeMgAl_{11}O_{19}$-Tb. The lamp contained 3.95 g of this mixture. At 0 hour the lamp produced 3275 lm and had a colour rendition index Ra=90. The colour point of the emitted radiation had the co-ordinates x=0.374 and y=0.377 (colour temperature 4185 K.). After an operating time of 100 hours a luminous flux of 3269 lm, a colour point x=0.377 and y=0.379, a colour temperature of 4121 K. and a colour rendition index Ra=90 were measured.

What is claimed is:

1. A luminescent screen provided with a luminescent layer which is dispersed on a support and contains an alkaline earth metal aluminate activated by bivalent europium, the alkaline earth metal being barium of which up to 25 mol.% may be replaced by strontium, characterized in that the aluminate has a crystal structure, the X-ray powder diagram of which corresponds at least substantially to the following X-ray powder diagram:

| d(Å) | I | d(Å) | I | d(Å) | I |
| --- | --- | --- | --- | --- | --- |
| 6.84 | 30 | 2.88 | 63 | 2.12 | 44 |
| 5.31 | 65 | 2.83 | 24 | 2.04 | 12 |
| 4.76 | 75 | 2.74 | 16 | 2.02 | 37 |
| 4.62 | 15 | 2.71 | 10 | 2.01 | 17 |
| 4.47 | 7 | 2.65 | 4 | 2.00 | 32 |
| 4.31 | 8 | 2.61 | 9 | 1.902 | 21 |
| 4.05 | 21 | 2.57 | 5 | 1.869 | 8 |
| 3.79 | 23 | 2.55 | 6 | 1.847 | 11 |
| 3.69 | 21 | 2.53 | 9 | 1.828 | 8 |
| 3.68 | 23 | 2.51 | 21 | 1.807 | 8 |
| 3.60 | 36 | 2.44 | 30 | 1.790 | 11 |
| 3.48 | 15 | 2.39 | 9 | 1.767 | 13 |
| 3.46 | 14 | 2.35 | 5 | 1.749 | 17 |
| 3.42 | 100 | 2.32 | 8 | 1.737 | 11 |
| 3.31 | 5 | 2.30 | 22 | 1.705 | 7 |
| 3.24 | 14 | 2.27 | 15 | 1.645 | 8 |
| 3.20 | 7 | 2.25 | 32 | 1.633 | 18 |
| 3.12 | 39 | 2.23 | 18 | 1.599 | 14 |
| 2.99 | 83 | 2.22 | 24 | 1.580 | 8 |
| 2.96 | 47 | 2.16 | 53 | 1.575 | 16 |
|  |  |  |  | 1.568 | 11 | in which the molar ratio of the alkaline earth metal to aluminum in the aluminate is from 1:5 to 1:10.

2. A luminescent screen as claimed in claim 1, characterized in that the aluminate has a composition defined by the formula $Me_{1-p}Eu_pAl_qO_{11/2q+1}$, in which Me is barium with up to 25 mol.% of barium being replaceable by strontium and in which $0.005 < p < 0.25$ and $5 < q < 10$.

3. A luminescent screen as claimed in claim 2, characterized in that $0.02 \leq p \leq 0.10$ and $7 \leq q \leq 9$.

4. A method of preparing a luminescent alkaline earth metal aluminate activated by bivalent europium for use in a luminescent screen as claimed in claim 1, characterized in that a mixture is made of barium oxide, of which up to 25 mol.% may be replaced by strontium oxide, alumina and europium oxide or of compounds which are converted to these oxides on heating, the molar ratio of alkaline earth metal to aluminium is chosen to lie between 1:5 and 1:10, whilst there is added to this mixture boron oxide or a compound which is converted to boron oxide on heating in a quantity of 0.002 to 0.05 mole of boron per mole of aluminum, in that the mixture is heated in a weakly reducing atmosphere at a temperature of 1100° C. to 1400° C., and in that after cooling, the product obtained is washed with water.

5. A low-pressure mercury vapor discharge lamp provided with a luminescent screen as claimed in claim 1.

6. A lamp as claimed in claim 5, characterized in that the luminescent screen further comprises a green luminescing and a red luminescing substance.

7. A lamp as claimed in claim 6, characterized in that the green luminescing substance is a terbium-activated cerium magnesium aluminate and the red luminescing substance is an yttrium oxide activated by trivalent europium.

* * * * *